United States Patent [19]

Yano et al.

[11] Patent Number: 4,883,250
[45] Date of Patent: Nov. 28, 1989

[54] VIBRATION-PROOF AND EARTHQUAKE-IMMUE MOUNT SYSTEM

[75] Inventors: Kenichi Yano, Tokyo; Hiroshi Midorikawa, Kanagawa; Toshiaki Kamei, Kanagawa; Takeharu Shizume, Kanagawa, all of Japan

[73] Assignees: Kajima Corporation; Kayaba Industry Co., Ltd., both of Tokyo, Japan

[21] Appl. No.: 166,441

[22] Filed: Mar. 10, 1988

[30] Foreign Application Priority Data

Mar. 12, 1987 [JP] Japan .................................. 62-58587

[51] Int. Cl.$^4$ .............................................. F16M 1/00
[52] U.S. Cl. .................................. 248/638; 52/167 R; 52/DIG. 4; 188/267; 248/550; 248/562; 248/599; 267/140.1; 267/140.5
[58] Field of Search ............... 267/140.1, 140.5, 64.13; 188/267; 248/561, 562, 580, 599, 638, 550; 52/167, DIG. 4

[56] References Cited

U.S. PATENT DOCUMENTS

| | | | |
|---|---|---|---|
| 2,055,000 | 9/1936 | Bacigalupo | 52/167 |
| 2,414,506 | 1/1947 | Bowen | 248/638 X |
| 3,771,270 | 11/1973 | Byers | 248/638 X |
| 4,496,130 | 1/1985 | Toyama | 52/167 X |
| 4,662,133 | 5/1987 | Kondo | 248/636 X |
| 4,699,348 | 10/1987 | Freudenberg | 188/267 X |
| 4,726,161 | 2/1988 | Yaghoubian | 52/167 |

FOREIGN PATENT DOCUMENTS 164520 8/1895 Japan .................................... 52/167

Primary Examiner—George E. A. Halvosa
Attorney, Agent, or Firm—Koda & Androlia

[57] ABSTRACT

A vibration-proof and earthquake immune mount system connecting machinery or a structure to a foundation which may be subject to external vibrations or earthquakes. The mount system includes a number of mounts operating in conjunction with a number of dampers, and both the mounts and the dampers function regardless of the direction of the external disturbance. In the mount this ominidirectionality is achieved by using a low-friction rolling contact between a ball attached to the machinery or structure and a dished surface attached to the foundation. Damping is provided by eddy current dissipation when a conductor plate attached to the structure of machinery and free to move in two directions is placed between the poles of an electromagnet which is integral with the foundation, and activated by a controller energized when a sensor detects motion of the foundation.

8 Claims, 3 Drawing Sheets

VIBRATION-PROOF AND EARTHQUAKE-IMMUE MOUNT SYSTEM

BACKGROUND OF THE INVENTION

1. Field of the Invention

The present invention relates to a vibration-proof and earthquake-immune mount system for machinery or buildings, and in particular to a mount system which can deal with horizontal vibrations and earthquakes of unpredictable direction.

2. Prior Art

Vibration-proof and earthquake-immune mounts which utilize vibration-proof springs or rubber are well known. Such mounts have usually been disposed between a movable component such as machinery or flooring and a stationary component such as machinery foundations or building foundations, respectively, to convert disturbing vibrations such as traffic vibration, construction work vibration, and earthquakes into a gentle movement of a relatively long period.

When there is provided only an elastic body such as spring or rubber as the vibration-proof mount, it is possible to lengthen the period of the vibration and to reduce its frequency. However, a suitable damper is required to restrain the displacement of the movable component such as machinery or flooring because the displacement is quite amplified.

For such damping, the prior art has utilized hydraulic dampers or the like by which vibration energy is converted to other energy forces such as heat to achieve a desired vibration absorption.

In the well known vibration-proof mount which utilizes springs or rubber, expansion and compression of the mount are limited to a single predetermined direction. Accordingly, to be effective for a vibration of unpredictable direction, such as a horizontal seismic vibration, one must provide a plurality of mounts of different orientation. Existing dampers such as hydraulic dampers also have a limited direction of operation. Therefore, a plurality of dampers having different orientations must be provided to overcome this inconvenience.

SUMMARY OF THE INVENTION

A principal object of the present invention is to provide an improved vibration-proof and earthquake-immune mount which can deal with the horizontal vibration occurring in all directions without the need for a plurality of mounts.

Another object of the present invention is to provide a mount which can effectively simplified and miniaturized and also counteracts vibrations from earthquakes of unpredictable direction.

To achieve the objects set forth above, the present invention proposes a vibration-proof and earthquake-immune mount system comprising a mouth with rollable spheres and a saucer having a conical or circular arc-shaped recess adapted to receive a rollable sphere. This mount is combined with a damper consisting of a magnetic body and a conductor plate, capable of being damped by the magnetic force developed by the magnetic body.

In accordance with the present invention, a disturbing vibration is converted by the sphere rolling on the saucer to a gentle movement of longer period and this conversion is obtained with an adequate and effective ratio independent of the direction in which the vibration occurs, since the sphere can roll in all directions.

Displacements larger than a predetermined amount are restrained by the damper, permitting a fine control to be achieved independent of the direction, since the damper controls the conductor plate by means of magnetic force.

DETAILED DESCRIPTION OF THE INVENTION

The present invention will be described in detail with reference to the accompanying drawing.

Figure 2:
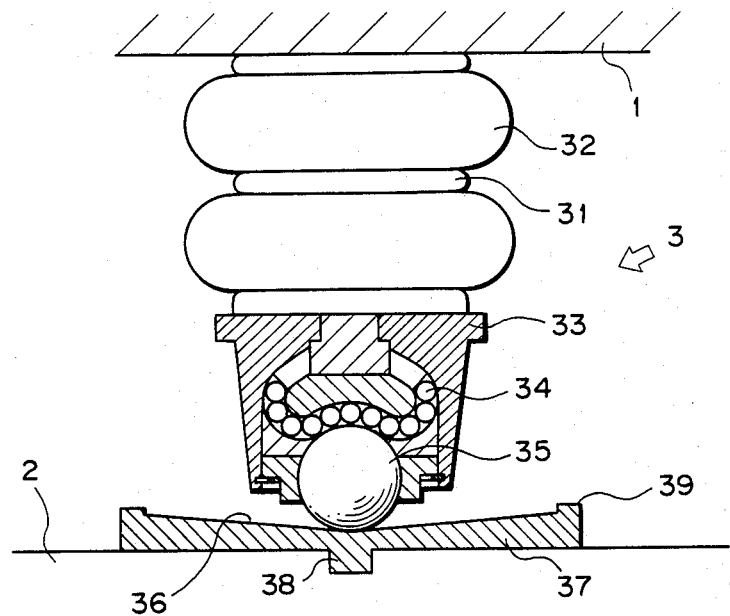
FIG. 2 is a partially sectioned side view showing details of one mount.

FIG. 2 illustrates an embodiment of the vibration-proof and earthquake-immune mount 3 constructed according to the present invention. Reference numeral 1 designates a movable component such as machinery and reference numeral 2 designates a stationary component such as a foundation with a typical mount 3 located between machinery 1 and foundation 2. Mount 3 includes an air spring 32 having a ring 31, at the intermediate drum portion thereof, and is secured to a bottom surface of machinery 1. A support 33 is mounted on the lower end of air spring 32. Support 33 contains a multiplicity of steel balls 34, each of relatively small diameter riding on the upper surface of a rollable steel ball 35 of larger diameter with its lower portion protruding from support 33. The lower portion of ball 35 rollably contacts conical recess 36 which forms the upper surface of thick walled saucer 37 which is mounted on foundation 2 by a protrusion 38 extending from the bottom surface of saucer 37. A dam 39 projects radially from the periphery of conical recess 36 to prevent ball 35 from rolling out of saucer 37.

It should be understood that in the vibration-proof and earthquake-immune mount 3 the single larger-diameter steel ball 35 may be replaced by a plurality of smaller-diameter balls, not shown, and the ball material is not limited to a metal such as steel. The saucer 37 also may have a circular arc-shaped recess rather than a conical one and the saucer material is not limited to a metal. Other embodiments may be used without departing from the spirit and scope of this invention.

Figure 1:
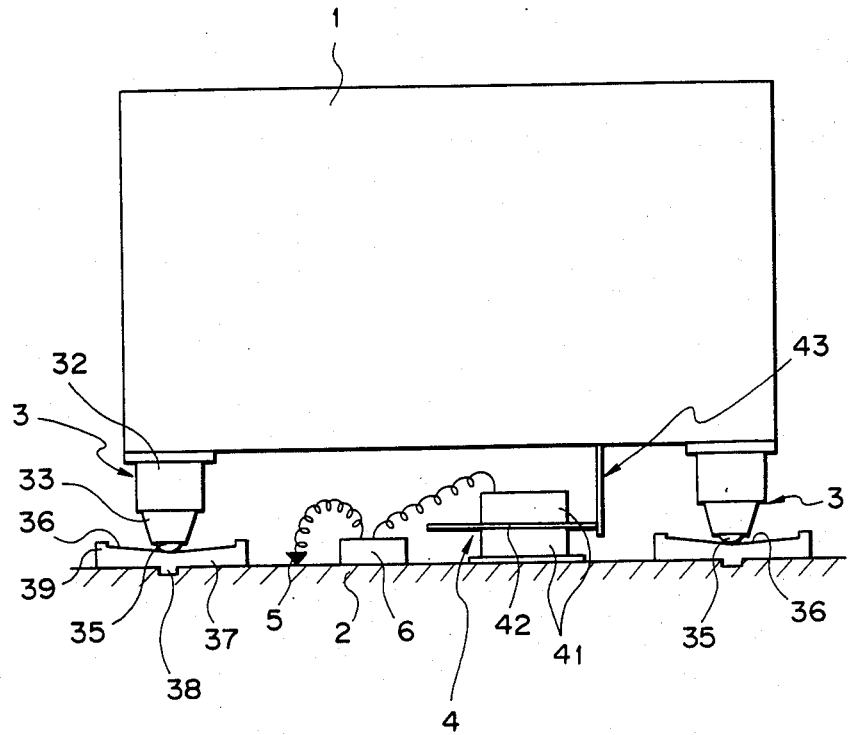
FIG. 1 is a side view showing one embodiment of the vibration-proof and earthquake-immune mount system constructed according to the present invention, comprising, typically, two mounts and one damper.

FIG. 1 shows a typical mount system according to the present invention, comprising two exemplars of mount 3, the details of which are shown in FIG. 2 and described above, in combination with a magnetic damper 4. This damper 4 includes an electromagnet 41 disposed within a frame structure, in the form of a split member defined by one or more coils and having north and south poles, the electromagnet 41 being mounted on foundation 2; a connector 43 such as a connecting bar mounted on the bottom surface of machinery 1; and a conductor plate 42 formed of sheet metal or the like connected to the connector 43 in such a manner that conductor plate 42 is slidable relative to a vertical movement and the free end thereof is interposed between the north and south poles of electromagnet 41. An accelerometer, a velocimeter or a vectormeter 5 serving as a sensor is, in turn, connected to a controller 6 for the electromagnet 41.

Figure 3:
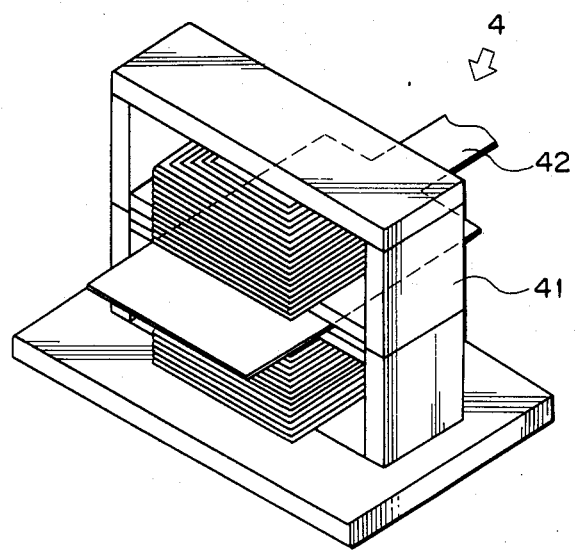
FIG. 3 is a perspective view showing the damper used in the mount system.
Figure 4:
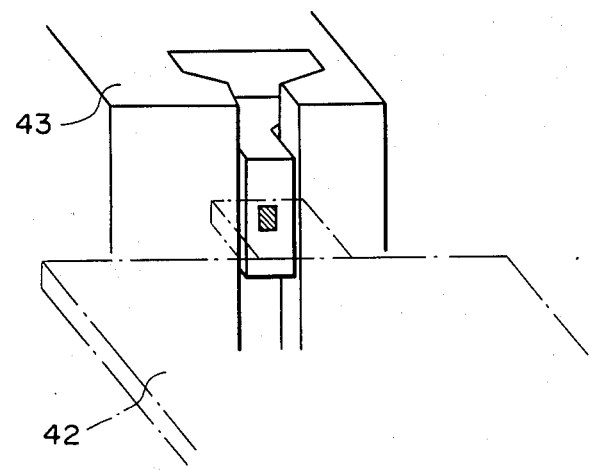
FIG. 4 is a perspective view showing the connecting structure for the conductor plate which is part of the damper of FIG. 3.

FIGS. 3 and 4 show details of how conductor plate 42 can slide between the poles of magnetic 41, and how connector plate 42 is connected to connector 43 so as to be vertically slidable, respectively.

Now the function and operation of the mount is described. Normally, the larger-diameter steel ball 35 is centrally positioned on the conical recess 36 so as to support machinery 1 on foundation 2.

When subjected to a horizontal vibration due to an earthquake or other causes, the larger-diameter steel ball 35 having its frictional force reduced by the smaller-diameter steel balls 34 rolls smoothly on the surface of conical recess 36 so as to convert the disturbing vibration to a gentle movement of a longer period.

Vertical vibration and vertical displacement of the steel ball 35 are effectively absorbed by the elasticity of the air-spring 32 supporting ball 35.

The effectiveness of the mount 3 in converting the incident vibration to a layer period increases as the friction coefficient between saucer 37 and steel ball 35 as well as the gradient of recess 36 decrease. However, the relative displacement of foundation 2 and machinery 1 may unacceptably increase as the effectiveness, i.e., the vibration attenuating effect, increases. Accordingly, the relative displacement must be suppressed before it exceeds a predetermined amount.

Sensor 5 detects when the displacement of machinery 1 relative to foundation 2 attains the predetermined amount and causes controller 6 to energize the electromagnet 41, causing it to develop a magnetic field.

When connector 43 connected to machinery 1 causes conductor plate 42 to pass through this magnetic field, an eddy current is produced in conductor plate 42 and this eddy current provides a braking effect. In this way, the vibration energy is absorbed and dissipated in the damper 4 in the form of thermal energy due to the conversion of the eddy current.

Although controller 6 has been described as the current controller for the electromagnet 41, it should be understood that a permanent magnet may be employed in the damper 4. In this case, a mechanical controller will be provided with a feedback mechanism to control the position of conductor plate 42 relative to the permanent magnet until the displacement thereof exceeds a predetermined amount.

Although the present invention has been described hereinabove in terms of an embodiment as a vibration-proof and earthquake-immune mount system particularly for machinery, the present invention is applicable also to buildings and other structures as a vibration-proof and earthquake-immune mount system for an entire building or floor.

As will be readily apparent from the foregoing description, the vibration-proof and earthquake-immune mount system of this invention effectively converts a disturbing vibration to a gentle movement of a longer period, utilizing reciprocating frictionless rolling of the sphere on the saucer and independent of the direction in which the disturbing vibration is propagated.

Furthermore, the present invention includes a damper utilizing the magnetic effect in combination with the mount to prevent an excessively large amount of relative displacement. By proper feedback control of the damper, the mount can deal with an earthquake or a collision vibration of which the propagation direction is unpredictable, since the damper of this invention is also effective independent of the orientation of the earthquake or other disturbing vibration.

We claim:

1. A vibration-proof and earthquake immune mount system connecting a structure to a foundation comprising a number of mounts for reducing vibrations of said structure in any direction and dampers for reducing horizontal vibrations of said structure provided between said structure and foundation, each of said mounts comprising:
a spring means connected to a bottom surface of said structure;
a support mounted on a lower end of said spring means;
a ball means rollably abutting said support at an upper surface of said ball means;
a saucer mounted on said foundation, an upper surface of said saucer being in the form of a recess which receives a lower surface of said ball means in rollable contact; and each of said dampers comprising:
an electromagnet with north and south poles mounted on said foundation;
a connector mounted on a bottom surface of said structure;
a conductor plate connected to said connector so as to be slidable in a vertical direction, the free end of said conductor plate being interposed between the north and south poles of said electromagnet;
a sensor for detecting movement of said foundation and for generating a signal when movement of said foundation exceeds a predetermined amount; and
a controller for receiving said signal from said sensor and for using said signal to control the electromagnet to develop a magnetic field which interacts with said conductor plate to produce eddy currents which generate a braking effect and absorb the disturbance energy when movement of said foundation exceeds a predetermined amount;

whereby horizontal vibrations may be absorbed.

2. A vibration-proof and earthquake immune mount system connecting g a structure to a foundation comprising;
a number of mounts functioning to reduce disturbances in any direction, each mount comprising:
a spring means connected to a bottom surface of said structure;
a support mounted on a lower end of the spring means containing a multiplicity of smaller-diameter balls;
a larger-diameter ball rollably abutting the smaller-diameter balls at an upper surface of said large-diameter ball;
a saucer mounted on said foundation by a protrusion on a lower surface of said saucer and with an upper surface of said saucer in the form of a recess which receives lower surface of the larger-diameter ball in rollable contact; and
a dam projecting radially outward from a periphery of the recess to prevent the larger-diameter ball from rolling out of the recess in response to an earthquake; and a number of dampers counteracting disturbances in a horizontal direction, each damper comprising:
  an electromagnet with north and south poles mounted on the foundation;
  a connector mounted on a bottom surface of the structure;
  a conductor plate connected to the connector in a manner such that the conductor plate is slidable in a vertical direction, the free end of the conductor plate being interposed between the north and south poles of the electromagnet;
  a sensor for detecting movement of the foundation and for generating a signal when movement of said foundation exceeds a predetermined amount; and
  a controller for receiving said signal from the sensor and for using said signal to control the electromagnet to develop a magnetic field which interacts with the conductor plate to produce eddy currents which generate a braking effect and absorb the disturbance energy when movement of said foundation exceeds a predetermined amount.

3. The mount system of claim 2, wherein the larger-diameter ball and the smaller-diameter balls are made of a metal such as steel.

4. The mount system of claim 2, wherein the recess is conical in shape.

5. The mount system of claim 2, wherein the recess has a shape of a circular arc.

6. The mount system of claim 2, wherein the sensor is an accelerometer.

7. The mount system of claim 2, wherein the sensor is a velocimeter.

8. The mount system of claim 2, wherein the sensor is a vectormeter.

* * * * *